US011373281B1

(12) United States Patent
Ravirala et al.

(10) Patent No.: US 11,373,281 B1
(45) Date of Patent: Jun. 28, 2022

(54) TECHNIQUES FOR ANCHOR FRAME SWITCHING

(71) Applicant: QUALCOMM Incorporated, San Diego, CA (US)

(72) Inventors: Narayana Karthik Ravirala, San Diego, CA (US); Xiaoyun Jiang, San Diego, CA (US); Shang-Chih Chuang, San Diego, CA (US); Yi-Chun Lu, San Diego, CA (US); Younsu Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/183,231

(22) Filed: Feb. 23, 2021

(51) Int. Cl.
  *G06T 5/00* (2006.01)
  *G06T 7/215* (2017.01)
  *G06T 5/50* (2006.01)

(52) U.S. Cl.
  CPC .............. *G06T 5/009* (2013.01); *G06T 5/50* (2013.01); *G06T 7/215* (2017.01); *G06T 2207/10016* (2013.01); *G06T 2207/10144* (2013.01); *G06T 2207/20208* (2013.01); *G06T 2207/20221* (2013.01)

(58) Field of Classification Search
  CPC .......... G06T 5/50; G06T 5/009; G06T 7/215; G06T 2207/20221; G06T 2207/20208; G06T 2207/10144; G06T 2207/10016
  See application file for complete search history.

(56) References Cited

U.S. PATENT DOCUMENTS

| | | | | |
|---|---|---|---|---|
| 8,525,800 B2* | 9/2013 | Kao | ...................... | G06F 3/0481 345/173 |
| 8,547,442 B2* | 10/2013 | Lasang | ................ | H04N 5/2355 348/208.6 |
| 8,570,396 B2* | 10/2013 | Rapaport | ................ | G09G 5/06 348/229.1 |
| 8,711,248 B2* | 4/2014 | Jandhyala | ................ | G06T 7/20 348/239 |
| 8,803,985 B2* | 8/2014 | Kaizu | ................ | H04N 5/35554 348/208.99 |
| 8,989,484 B2* | 3/2015 | Moon | ................ | G06T 5/009 382/162 |
| 9,055,231 B2* | 6/2015 | Garten | ................ | G09G 5/06 |
| 9,124,809 B2* | 9/2015 | Kaizu | ................ | H04N 5/2353 |
| 9,674,439 B1* | 6/2017 | Mihic | ................ | G06T 5/003 |
| 10,002,436 B2* | 6/2018 | Yamada | ................ | H04N 5/2353 |
| 10,095,829 B2* | 10/2018 | Lazar | ................ | G16H 20/10 |
| 10,467,732 B2* | 11/2019 | Dewhurst | ................ | G06T 5/50 |
| 10,560,629 B2* | 2/2020 | Duran | ................ | H04N 5/2355 |

(Continued)

*Primary Examiner* — Brian P Yenke
(74) *Attorney, Agent, or Firm* — Qualcomm Incorporated

(57) ABSTRACT

Methods, systems, and devices for anchor frame switching in an imaging system are described. A device may generate a pixel map based on a set of frames. A first subset of frames of the set of frames have a first exposure and a second subset of frames of the set of frames have a second exposure different than the first exposure. The device may determine a region of the pixel map representing motion between at least two frames of the first set of frames. If the device determines that a quantity of motion pixels in the region is higher than a threshold, the device may select a short exposure frame as an anchor frame, beginning at a later frame. Otherwise, the device may maintain using a long exposure frame as the anchor frame.

20 Claims, 10 Drawing Sheets

(56) References Cited

U.S. PATENT DOCUMENTS

| | | | |
|---|---|---|---|
| 10,911,691 B1* | 2/2021 | Le | G06T 5/002 |
| 10,977,778 B2* | 4/2021 | Tico | G06T 5/50 |
| 11,017,509 B2* | 5/2021 | Bouzaraa | G06T 5/10 |
| 11,062,436 B2* | 7/2021 | Pekkucuksen | H04N 5/23277 |
| 11,082,628 B2* | 8/2021 | Tasdizen | H04N 7/0132 |
| 11,107,205 B2* | 8/2021 | Hu | G06N 3/0454 |
| 11,113,801 B1* | 9/2021 | Cheng | G06T 5/001 |
| 11,128,809 B2* | 9/2021 | Zhen | G06T 5/50 |
| 11,151,731 B2* | 10/2021 | Zhen | G06T 7/215 |
| 11,172,151 B2* | 11/2021 | Suzuki | H04N 5/3745 |
| 11,189,017 B1* | 11/2021 | Baqai | G06V 10/751 |
| 11,196,918 B2* | 12/2021 | Douady | H04N 19/597 |
| 11,196,937 B2* | 12/2021 | Yao | H04N 19/98 |
| 11,265,480 B2* | 3/2022 | Segapelli | H04N 5/2353 |
| 11,297,234 B2* | 4/2022 | Duran | H04N 5/2355 |
| 2013/0070965 A1* | 3/2013 | Jang | G06T 5/007 382/103 |
| 2013/0314568 A1* | 11/2013 | Vranceanu | G06T 5/40 348/239 |
| 2015/0097978 A1* | 4/2015 | Lee | H04N 5/23277 348/208.6 |
| 2018/0035058 A1* | 2/2018 | Thumpudi | G06T 7/90 |
| 2021/0248758 A1* | 8/2021 | Li | H04N 5/347 |
| 2021/0314474 A1* | 10/2021 | Yang | H04N 5/2356 |
| 2021/0321030 A1* | 10/2021 | Desai | H04N 5/35581 |

\* cited by examiner

US 11,373,281 B1

TECHNIQUES FOR ANCHOR FRAME SWITCHING

BACKGROUND

The following relates to image processing, including techniques for anchor frame switching in an imaging system.

Multimedia systems are widely deployed to provide various types of multimedia communication content such as voice, video, packet data, messaging, broadcast, and so on. These multimedia systems may be capable of processing, storage, generation, manipulation and rendition of multimedia information. Examples of multimedia systems include high-dynamic-range (HDR) systems. These systems may employ a combination of hardware and software technologies to support processing, storage, generation, manipulation and rendition of multimedia information, for example, such as capture devices, storage devices, communication networks, computer systems, and display devices.

SUMMARY

The described techniques relate to improved methods, systems, devices, and apparatuses that support techniques for image processing. The described techniques may include configuring a device to capture an image of a scene using two or more exposures (e.g., a short exposure, a medium exposure, or a long exposure) and then combining these images to provide an HDR image. In some cases, combining short exposure images and long exposure images may be difficult due to motion (e.g., of the device). To provide improvements to HDR imaging, the device may be configured to dynamically switch between using one type of exposure (e.g., a long exposure) and another type of exposure (e.g., a short exposure) as an anchor for providing the HDR images. For example, the device may generate a pixel map beginning from a frame N (where N is a positive integer) based on a set of a short exposure frames and a set of long exposure frames.

The device may feed each exposure frame into an image processing engine (IPE) associated with the device. After frame alignment, the device may generate the pixel map, for example, using a long exposure frame, and determine a region representing motion between at least two images (e.g., frame N and frame N+1). If the device determines that a quantity of motion pixels in the region is higher than a threshold, the device may select a short exposure frame as an anchor frame, beginning at a later frame (e.g., frame N+3). Alternatively, if the device determines that the quantity of motion pixels in the region is less than the threshold, the device may continue using a long exposure frame as the anchor frame. Based on the switching of the type of exposure frame for the anchor frame, the device may efficiently and effectively provide an HDR image.

A method for image processing at a device is described. The method may include generating a pixel map based on a first set of frames, where a first subset of frames of the first set of frames have a first exposure and a second subset of frames of the first set of frames have a second exposure different than the first exposure, determining a region of the pixel map representing motion between at least two frames of the first set of frames, selecting an anchor frame based on comparing a set of motion pixels associated with the region of the pixel map to a threshold, where the anchor frame has the first exposure or the second exposure, and generating an image frame by combining a second set of frames based on the anchor frame.

An apparatus for image processing is described. The apparatus may include a processor, memory coupled with the processor, and instructions stored in the memory. The instructions may be executable by the processor to cause the apparatus to generate a pixel map based on a first set of frames, where a first subset of frames of the first set of frames have a first exposure and a second subset of frames of the first set of frames have a second exposure different than the first exposure, determine a region of the pixel map representing motion between at least two frames of the first set of frames, select an anchor frame based on comparing a set of motion pixels associated with the region of the pixel map to a threshold, where the anchor frame has the first exposure or the second exposure, and generate an image frame by combining a second set of frames based on the anchor frame.

Another apparatus for image processing is described. The apparatus may include means for generating a pixel map based on a first set of frames, where a first subset of frames of the first set of frames have a first exposure and a second subset of frames of the first set of frames have a second exposure different than the first exposure, means for determining a region of the pixel map representing motion between at least two frames of the first set of frames, means for selecting an anchor frame based on comparing a set of motion pixels associated with the region of the pixel map to a threshold, where the anchor frame has the first exposure or the second exposure, and means for generating an image frame by combining a second set of frames based on the anchor frame.

A non-transitory computer-readable medium storing code for image processing at a device is described. The code may include instructions executable by a processor to generate a pixel map based on a first set of frames, where a first subset of frames of the first set of frames have a first exposure and a second subset of frames of the first set of frames have a second exposure different than the first exposure, determine a region of the pixel map representing motion between at least two frames of the first set of frames, select an anchor frame based on comparing a set of motion pixels associated with the region of the pixel map to a threshold, where the anchor frame has the first exposure or the second exposure, and generate an image frame by combining a second set of frames based on the anchor frame.

Some examples of the method, apparatuses, and non-transitory computer-readable medium described herein may further include operations, features, means, or instructions for selecting a first frame of the first subset of frames as the anchor frame. In some examples of the method, apparatuses, and non-transitory computer-readable medium described herein, the first frame may have the first exposure. In some examples of the method, apparatuses, and non-transitory computer-readable medium described herein, the generating of the image frame by combining the second set of frames may be based on the selecting of the first frame of the first subset of frames as the anchor frame.

Some examples of the method, apparatuses, and non-transitory computer-readable medium described herein may further include operations, features, means, or instructions for determining that the set of motion pixels associated with the region of the pixel map fails to satisfy the threshold and maintaining the first frame of the first subset of frames as the anchor frame based on the determining that the set of motion pixels associated with the region of the pixel map fails to satisfy the threshold.

Some examples of the method, apparatuses, and non-transitory computer-readable medium described herein may further include operations, features, means, or instructions for determining that the set of motion pixels associated with the region of the pixel map satisfies the threshold and selecting a second frame of the second subset of frames as the anchor frame based on the determining that the set of motion pixels associated with the region of the pixel map satisfies the threshold. In some examples of the method, apparatuses, and non-transitory computer-readable medium described herein, the second frame may have the second exposure.

Some examples of the method, apparatuses, and non-transitory computer-readable medium described herein may further include operations, features, means, or instructions for switching from the first frame as the anchor frame to the second frame as the anchor frame. In some examples of the method, apparatuses, and non-transitory computer-readable medium described herein, the generating of the image frame by the combining of the second set of frames based on the switching.

Some examples of the method, apparatuses, and non-transitory computer-readable medium described herein may further include operations, features, means, or instructions for enabling a hysteresis control for different exposure levels based on the switching from the first frame as the anchor frame to the second frame as the anchor frame.

Some examples of the method, apparatuses, and non-transitory computer-readable medium described herein may further include operations, features, means, or instructions for capturing the first set of frames using one or more image sensors of the device. In some examples of the method, apparatuses, and non-transitory computer-readable medium described herein, the generating of the pixel map may be based on the capturing of the first set of frames.

In some examples of the method, apparatuses, and non-transitory computer-readable medium described herein, a third subset of frames of the second set of frames may have the first exposure and a fourth subset of frames of the second set of frames may have the second exposure.

Some examples of the method, apparatuses, and non-transitory computer-readable medium described herein may further include operations, features, means, or instructions for determining that the set of motion pixels satisfies the threshold based on determining that a quantity of the set of motion pixels satisfies a quantity threshold. In some examples of the method, apparatuses, and non-transitory computer-readable medium described herein, the selecting of the anchor frame may be based on the determining that the quantity of the set of motion pixels satisfies the quantity threshold.

In some examples of the method, apparatuses, and non-transitory computer-readable medium described herein, the second exposure may be different from the first exposure.

In some examples of the method, apparatuses, and non-transitory computer-readable medium described herein, the first exposure includes a short exposure, a medium exposure, or a long exposure.

In some examples of the method, apparatuses, and non-transitory computer-readable medium described herein, the second exposure includes the short exposure, the medium exposure, or the long exposure.

In some examples of the method, apparatuses, and non-transitory computer-readable medium described herein, the image frame includes an HDR image frame.

DETAILED DESCRIPTION

Figure 1:
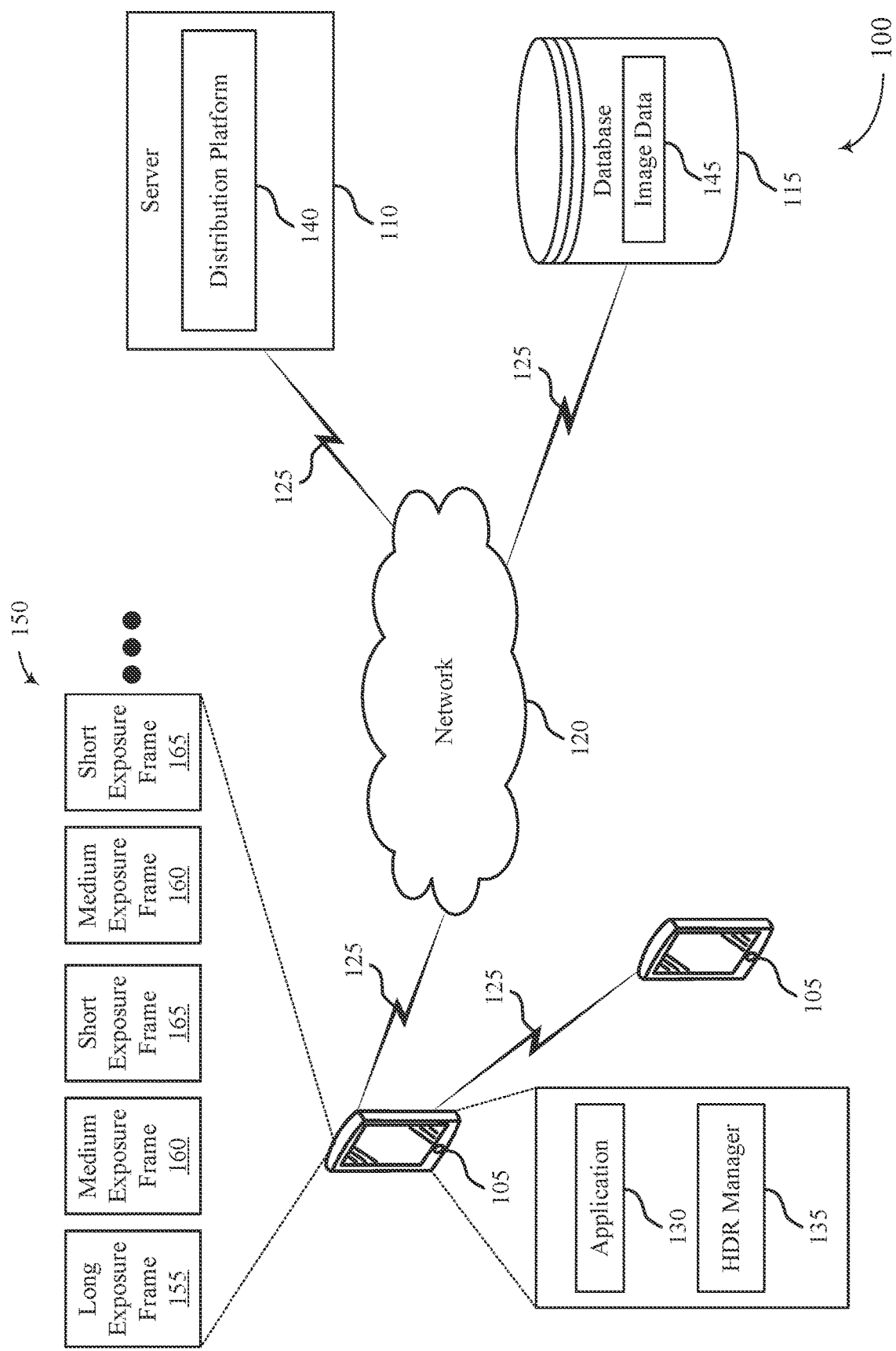
FIG. 1 illustrates an example of a multimedia system that supports techniques for anchor frame switching in accordance with aspects of the present disclosure.

Various aspects of the present disclosure relate to a device configured to support high-dynamic-range (HDR) imaging. The device may generate an HDR image by combining multiple exposure frames into a single frame. For example, the device may combine short exposure frames, medium exposure frames, and long exposure frames to generate the HDR image. In some cases, short exposure frames may provide a relatively higher dynamic range and long exposure frames may provide a relatively improved (e.g., reduced) noise level. The device may capture the different frames at different exposures using, for example, an image sensor. Prior to combining the frames, the device may analyze pixel information (e.g., pixel brightness, motion) to generate a fusion map for combining frames having different exposures. In some examples, the number of exposure levels is two or three although more than three exposure levels may be implemented.

For example, an image signal processor (ISP) of the device may analyze pixel brightness and motion from multiple frames before combining them into a single frame. The ISP of the device may generate a pixel map to facilitate the combination of different exposure frames. In some cases, the ISP may first combine frames having the same exposure, followed by combining frames having different exposures. For example, the ISP may combine the frames using multi-frame noise reduction techniques. In some cases, a relatively smooth blending transition between image regions of different exposure frames may be desired.

In some cases, combining of multiple frames having different exposures may result in artifacts, such as ghosting. Ghosting may be caused when moving objects across multiple frames are combined into a single frame. For example, in a target region (also referred to as a motion region), if an anchor frame is a short exposure frame, blending pixels among long exposure frames and short exposure frames may result in moving objects appearing fragmented. Alternatively, if an anchor frame is a long exposure frame, blending pixels may result in motion ghosting. Therefore it may be desirable to provide improvements for correcting artifacts, such as ghosting for improved HDR imaging.

To reduce or eliminate the artifacts, such as ghosting when combining multiple frames having different exposures, the device may be configured to change between using one type of exposure (e.g., a long exposure) and another type of exposure (e.g., a short exposure) as an anchor for providing an HDR image. For example, the device may generate a pixel map (also referred to as a highlight motion pixel map) beginning from a frame N (where N is a positive integer) based on a set of a short exposure frames and a set of long exposure frames. The device may forward each exposure frame into an IPE associated with the device for additional processing, such as frame alignment of the frames.

After the frame alignment, the device may generate the pixel map, for example, using a long exposure frame, and determine a region representing motion between at least two images (e.g., frames). If the device determines that a quantity of motion pixels in the region is higher than a threshold, the device may select a short exposure frame as an anchor frame, beginning at a later frame. Otherwise, if the device determines that the quantity of motion pixels in the region is less than the threshold, the device may continue using a long exposure frame as the anchor frame. In some cases, the described techniques may include incorporating hysteresis control to prevent flickering. Based on the dynamic switching of the type of exposure frame for the anchor frame, the device may efficiently and effectively provide an HDR image. Additionally, based on using the pixel map to detect highlight motion pixels to handle highlight motion ghost artifacts, the device may reduce power consumption and decreased resource usage.

Aspects of the disclosure are initially described in the context of a multimedia system. Aspects of the disclosure are further illustrated by and described with reference to apparatus diagrams, system diagrams, and flowcharts that relate to anchor frame switching in an imaging system.

FIG. 1 illustrates a multimedia system 100 for a device that supports techniques for anchor frame switching in accordance with aspects of the present disclosure. The multimedia system 100 may include devices 105, a server 110, and a database 115. Although, the multimedia system 100 illustrates two devices 105, a single server 110, a single database 115, and a single network 120, the present disclosure applies to any multimedia system architecture having one or more devices 105, servers 110, databases 115, and networks 120. The devices 105, the server 110, and the database 115 may communicate with each other and exchange information that supports anchor frame switching via network 120 using communications links 125. In some cases, a portion or all of the techniques described herein supporting anchor frame switching may be performed by the devices 105 or the server 110, or both.

A device 105 may be a smartphone, a wireless communication device, a handheld device, a tablet computer, a laptop computer, a display device (e.g., monitors), and/or the like that supports various types of communication and functional features related to multimedia (e.g., transmitting, receiving, broadcasting, streaming, sinking, capturing, storing, and recording multimedia data). A device 105 may, additionally or alternatively, be referred to by those skilled in the art as a user equipment (UE), a user device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the devices 105 may also be able to communicate directly with another device (e.g., using a peer-to-peer (P2P) or device-to-device (D2D) protocol). For example, a device 105 may be able to receive from or transmit to another device 105 variety of information, such as instructions or commands (e.g., multimedia-related information).

The devices 105 may include an application 130 and an HDR manager 135. While, the multimedia system 100 illustrates the devices 105 including both the application 130 and the HDR manager 135, the application 130 and the HDR manager 135 may be an optional feature for the devices 105. In some cases, the application 130 may be a multimedia-based application that can receive (e.g., download, stream, broadcast) from the server 110, database 115 or another device 105, or transmit (e.g., upload) multimedia data to the server 110, the database 115, or to another device 105 via using communications links 125.

The HDR manager 135 may be part of a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), a discrete gate or transistor logic component, a discrete hardware component, or any combination thereof, or other programmable logic device, discrete gate or transistor logic, discrete hardware components, or any combination thereof designed to perform the functions described in the present disclosure, and/or the like. For example, the HDR manager 135 may process image data (e.g., image data) from and/or write image data to a local memory of the device 105 or to the database 115.

The HDR manager 135 may also be configured to provide image enhancements, image restoration, image analysis, image compression, among other functionality. For example, the HDR manager 135 may perform white balancing, cropping, scaling (e.g., image compression), adjusting a resolution, color processing, filtering, artifact removal, frame rate adjustments, image data encoding, and image data decoding. By further example, the HDR manager 135 may process image data to support anchor frame switching in the multimedia system 100, according to the techniques described herein.

The devices 105 may include cameras (e.g., image sensors) that can be used to capture a set of images 150 (also referred to as frames) at different exposures levels (also referred to as exposure durations). For example, the set of images 150 may include one or more long exposure frames 155, medium exposure frames 160, or short exposure frames 165, or a combination thereof. The devices 105 may create an HDR scene by fusing multiplex exposure frames (e.g., long exposure frames 155, medium exposure frames 160, or short exposure frames 165, or a combination thereof) into a single HDR frame.

A long exposure frame 155 may correspond to an image captured at a third exposure level (or a third exposure duration). A medium exposure frame 160 may correspond to an image captured at a second exposure level (or a second exposure duration). A short exposure frame 165 may correspond to an image captured at a first exposure level (or a first exposure duration). In some examples, the third exposure level is greater than the second exposure level. In some examples, the second exposure level is greater than the first exposure level.

The devices 105 may selectively control the exposure levels of individual image sensors of an image sensor array. In some cases, cameras on the devices 105 may suffer from a number of shortcomings. For example, cameras on the devices 105 may capture the set of images 150, which may be impacted by ghost artifacts or limited sharpness, such as when capturing images with motion and high saturation. This is typically because image sensors in the cameras have limited dynamic range. It is possible to capture multiple image frames of a scene and then combine the image frames to produce a blended image. However, producing a blended image from a set of image frames with different exposures is a challenging process, especially for dynamic scenes which may include ghost artifacts.

To reduce or eliminate the artifacts, such as ghosting when combining multiple frames having different exposures, the devices 105 may be configured to change between using one type of exposure (e.g., a long exposure) and another type of exposure (e.g., a short exposure) as an anchor for providing an HDR image. For example, the devices 105 may generate a pixel map (also referred to as a highlight motion map) beginning from a frame N (where N is a positive integer) based on a set of a short exposure frames (e.g., short exposure frames 165) and a set of long exposure frames (e.g., short exposure frames 165). The devices 105 may input each exposure frame into an IPE associated with the devices 105 for additional processing, such as frame alignment of the frames.

After the alignment of the frames, the devices 105 may generate the pixel map, for example, using a long exposure frame, and determine a region representing motion between at least two images (e.g., frames). If the devices 105 determine that a quantity of motion pixels in the region is higher than a threshold, the devices 105 may select a short exposure frame as an anchor frame, beginning at a later frame. Otherwise, if the devices 105 determine that the quantity of motion pixels in the region is less than the threshold, the devices 105 may continue using a long exposure frame as the anchor frame.

By way of example, the device 105 may generate a pixel map based on a first set of frames, where a first subset of frames (e.g., long exposure frames 155) of the first set of frames have a first exposure (e.g., long exposure) and a second subset of frames (e.g., short exposure frames 165) of the first set of frames have a second exposure (e.g., short exposure) different than the first exposure. The device 105 may determine a region of the pixel map representing motion between at least two frames of the first set of frames. The device 105 may generate an HDR image frame by combining a second set of frames based at least in part on the anchor frame. In some examples, the device 105 may select a first frame of the first subset of frames as the anchor frame, where the first frame has the first exposure (e.g., long exposure or short exposure). As such, the device 105 may generate the HDR image frame by combining the second set of frames based at least in part on the selecting of the first frame of the first subset of frames as the anchor frame.

In some examples, the device 105 may determine that the set of motion pixels associated with the region of the pixel map fails to satisfy the threshold, and may maintain the first frame of the first subset of frames as the anchor frame based at least in part on the determining that the set of motion pixels associated with the region of the pixel map fails to satisfy the threshold. Alternatively, the device 105 may determine that the set of motion pixels associated with the region of the pixel map satisfies the threshold, and select a second frame of the second subset of frames as the anchor frame based at least in part on the determining that the set of motion pixels associated with the region of the pixel map satisfies the threshold. The second frame has the second exposure (e.g., long exposure or short exposure). The device 105 may switch from the first frame as the anchor frame to the second frame as the anchor frame. As such, the device 105 may generate the HDR image frame by the combining of the second set of frames based at least in part on the switching. In some examples, the device 105 may enable a hysteresis control for different exposure levels based at least in part on the switching from the first frame as the anchor frame to the second frame as the anchor frame.

If an anchor frame has a short exposure, parts of pixels from the long exposure and parts of pixels from the short exposure may be fragmented in a resulting combined image. Alternatively, if an anchor frame has a long exposure, parts of pixels from the long exposure and parts of pixels from the short exposure may experience ghosting artifacts. The devices 105 may thus dynamically select a global anchor frame (e.g., between a short exposure or a long exposure), which may have sufficient balance between handling ghost artifacts and noise in HDR images. In some cases, the devices 105 may be configured to enable hysteresis control to prevent flickering. For example, the devices 105 may be configured to handle the switching of the type of exposure frame for the anchor frame based on one or more tuning parameters to achieve users' preference (e.g., sharpness of an image, etc.). Based on the switching of the type of exposure frame for the anchor frame, the devices 105 may efficiently and effectively provide an HDR image.

The server 110 may be a data server, a cloud server, a server associated with a subscription provider, proxy server, web server, application server, communications server, home server, mobile server, or any combination thereof. The server 110 may in some cases include a distribution platform 140. The distribution platform 140 may allow the devices 105 to discover, browse, share, and download content via network 120 using communications links 125, and therefore provide a digital distribution of the content from the distribution platform 140. As such, a digital distribution may be a form of delivering content such as audio, video, images, without the use of physical media but over online delivery mediums, such as the Internet. For example, the devices 105 may upload or download image processing applications for downloading, uploading, processing, enhancing, etc. content (e.g., images, audio, video). The server 110 may also transmit to the devices 105 a variety of information, such as instructions or commands to download image processing applications on the devices 105.

The database 115 may store a variety of information, such as instructions or commands (e.g., image information). For example, the database 115 may store captured image data 145, which may be an HDR image. The device 105 may retrieve the stored image data 145 from the database 115 via the network 120 using communication links 125. In some examples, the database 115 may be a relational database (e.g., a relational database management system (RDBMS) or a Structured Query Language (SQL) database), a non-relational database, a network database, an object-oriented database, or other type of database, that stores the variety of information, such as instructions or commands (e.g., multimedia-related information).

The network 120 may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)), etc. Network 120 may include the Internet.

The communications links 125 shown in the multimedia system 100 may include uplink transmissions from the device 105 to the server 110 and the database 115, and/or downlink transmissions, from the server 110 and the database 115 to the device 105. The communication links 125 may transmit bidirectional communications and/or unidirectional communications. In some examples, the communication links 125 may be a wired connection or a wireless connection, or both. For example, the communications links 125 may include one or more connections, including but not limited to, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

The techniques described herein may provide improvements to HDR imaging. Furthermore, the techniques described herein may provide benefits and enhancements to the operation of the devices 105. For example, by providing efficient HDR imaging at the devices 105, the operational characteristics, such as power consumption, processor utilization (e.g., DSP, CPU, GPU, ISP processing utilization), and memory usage of the devices 105 may be reduced.

Figure 2:
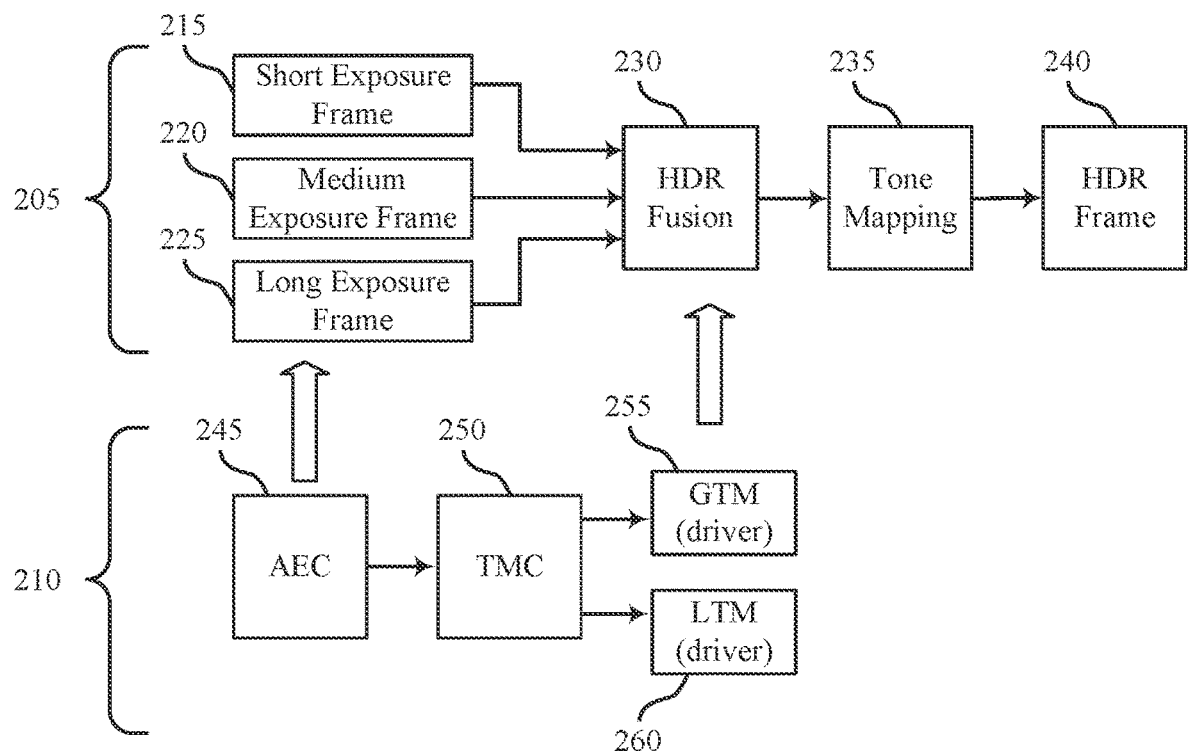
FIG. 2 illustrates an example of an HDR system that supports techniques for anchor frame switching in accordance with aspects of the present disclosure.

FIG. 2 illustrates an example of an HDR system 200 that supports techniques for anchor frame switching in accordance with aspects of the present disclosure. For example, the HDR system 200 may be implemented by or may implement one or more aspects of the multimedia system 100. For example, the HDR system 200 may be implemented by a device 105 as described with reference to FIG. 1. The HDR system 200 may include a hardware pipeline 205 and a software pipeline 210. The hardware pipeline 205 may support pixel-processing such as, HDR fusion (e.g., at 230) and tone mapping (e.g., at 235). The software pipeline 210 may support automatic exposure control (e.g., at 245), tone mapping control (e.g., at 250), and tone mapping drivers (e.g., a global tone mapping (GTM) driver 255, a local tone mapping (LTM) driver 260).

The device 105 may perform automatic exposure control (AEC) operations via the AEC component. For example, the device 105 may determine different exposures based on parameters such as image brightness and image histogram of an image to be captured. Based on the different exposures, the device 105 may configure an image sensor for capturing the image. For example, the device 105 may configure parameters such as exposure time and gain. The device 105 may perform tone mapping control (TMC) operations via the TMC 250, for example, using a TMC library. The device 105 may control the tone mapping via tone mapping drivers (e.g., the GTM driver 255, the LTM driver 260). In some aspects, tone mapping control may include boosting an image brightness based on guidance by the AEC component 245. For example, the device 105 may determine one or more dynamic range compression (DRC) parameters, such as a DRC gain light and a DRC gain dark, which the device 105 may provide to the TMC component 250.

The device 105 may capture a set of images at different exposures and process captured the set of images using an HDR fusion component 230. For example, the device 105 may capture a set of images at different exposures including one or more short exposure frames 215, medium exposure frames 220, or long exposure frames 225, or a combination thereof. A short exposure frame may correspond to an image captured at a first exposure level (or a first exposure duration). A medium exposure frame may correspond to an image captured at a second exposure level (or a second exposure duration). A long exposure frame may correspond to an image captured at a third exposure level (or a third exposure duration). In some examples, the third exposure level is greater than the second exposure level. In some examples, the second exposure level is greater than the first exposure level.

The device 105 may forward the one or more short exposure frames 215, medium exposure frames 220, or long exposure frames 225, or a combination thereof to an ISP of the HDR system 200. In some cases, the ISP may analyze brightness and motion information associated with multiple frames of different exposures (e.g., short exposure frame 215, medium exposure frame 220, long exposure frame 225, or a combination thereof) and fuse the frames into a high-bit frame. In some examples, the device 105 may fuse frames having the same exposure levels. That is, if more than one frame has the same exposure level, these frames are fused first before subsequently fusing frames of other exposures. The device 105 may apply tone mapping techniques for tone mapping the high-bit frame to a low-bit frame via the tone mapping component 235. The pixel bits of the frames may be stored in memory registers of the device 105. In some cases, the device 105 may achieve the tone mapping using tone mapping components (e.g., GTM driver 255, LTM driver 260). As a result, the device 105 may output an HDR frame 240.

Figure 3:
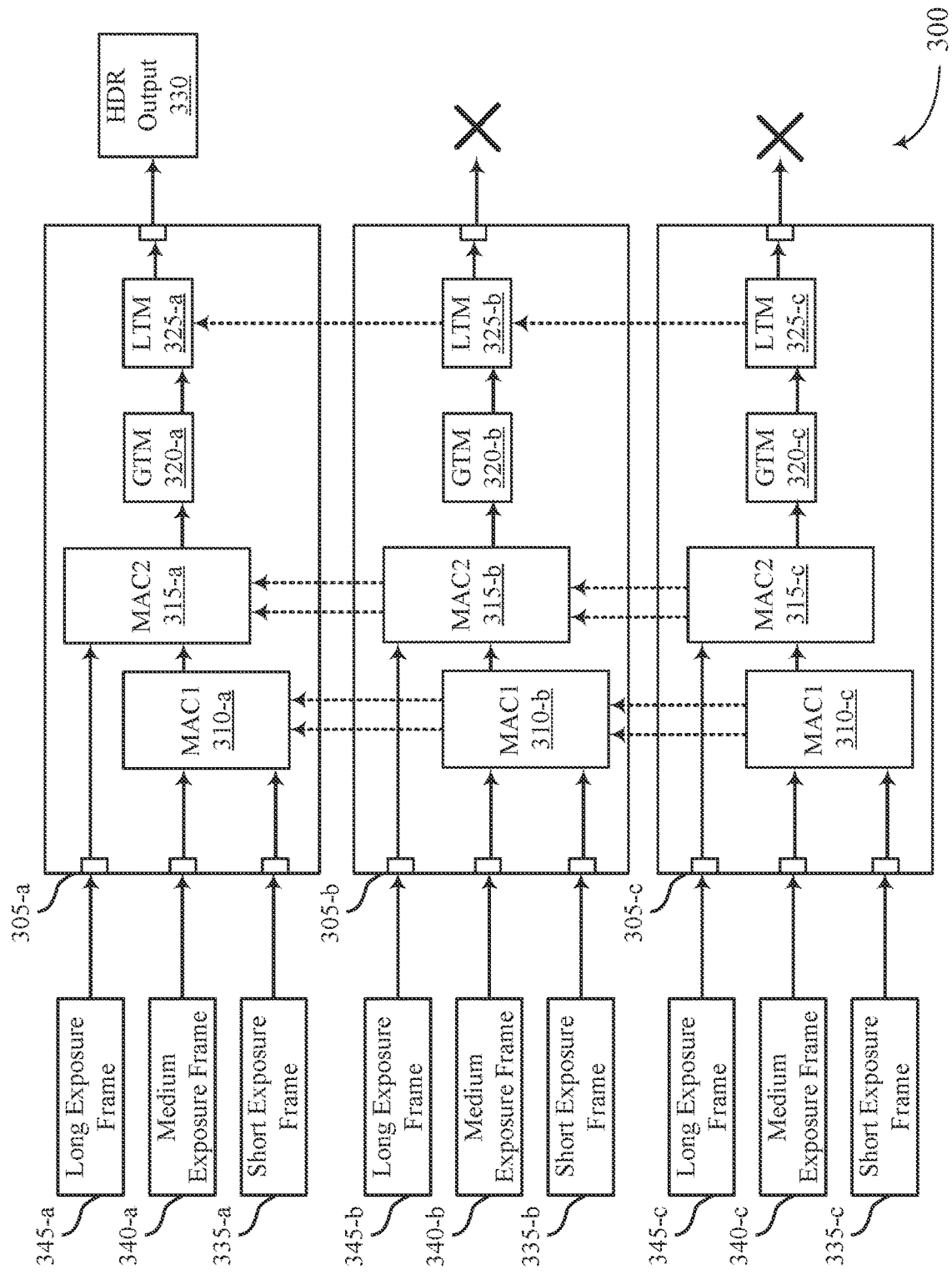
FIG. 3 illustrates an example of a process flow that supports techniques for anchor frame switching in accordance with aspects of the present disclosure.

FIG. 3 illustrates an example of a process flow 300 that supports techniques for anchor frame switching in accordance with aspects of the present disclosure. The process flow 300 may implement aspects of the multimedia system 100 or the HDR system 200 or may be implemented by aspects of the multimedia system 100 or the HDR system 200 as described with reference to FIGS. 1 and 2, respectively. For example, the process flow 300 may be based on a configuration by a device 105, which may be implemented by the device 105.

A device 105 may include one or more IPE which may include one or more image processing pipelines 305. In the example of FIG. 3, a device 105 may include an image processing pipelines 305-*a*, an image processing pipelines 305-*b*, and image processing pipelines 305-*c*. Each of the image processing pipelines 305 may include a MAC1 310, a MAC2 315, a GTM 320 (e.g., a GTM driver), and an LTM 325 (e.g., an LTM driver). One or more of the MAC1 310, the MAC2 315, the GTM 320, and the LTM 325 of a respective image processing pipeline 305 may be coupled (e.g., operatively, communicatively, functionally, electronically) to each other.

In the following description of the process flow 300, the operations between one or more of the MAC1 310, the MAC2 315, the GTM 320, and the LTM 325 of a respective image processing pipeline 305 may be transmitted in a different order than the example order shown, or the operations performed by one or more of the MAC1 310, the MAC2 315, the GTM 320, and the LTM 325 of a respective image processing pipeline 305 may be performed in different orders or at different times. Some operations may also be omitted from the process flow 300, and other operations may be added to the process flow 300.

The image processing pipelines 305-a may receive a set of frames with different exposures. For example, the image processing pipelines 305-a may receive a long exposure frame 345-a, a medium exposure frame 340-a, and a short exposure frame 335-a. The MAC1 310-a may receive as input the medium exposure frame 340-a and the short exposure frame 335-a. The MAC1 310-a may perform one or more image processing operations on the medium exposure frame 340-a and the short exposure frame 335-a to produce a resultant exposure frame (e.g., a combined exposure frame). The MAC2 315-a may include a first input for receiving the long exposure frame 345-a and a second input for receiving the resultant exposure frame from the MAC1 310-a. The MAC2 315-a may perform one or more image processing operations on the resultant exposure frame received from the MAC1 310-a and the short exposure frame 335-a to produce a resultant exposure frame (e.g., a combined exposure frame).

One or more of the MAC1 310-a and the MAC2 315-a may generate a pixel map, for example, using the long exposure frame 345-a, and determine a region representing motion between at least two frames (e.g., the medium exposure frame 340-a and the short exposure frame 335-a). If the device 105 determines that a quantity of motion pixels in the region is higher than a threshold, the device 105 may select the short exposure frame 335-a as an anchor frame, beginning at a later frame (e.g., frame N+3). Alternatively, if the device 105 determines that the quantity of motion pixels in the region is less than the threshold, the device 105 may continue using the long exposure frame 345-a as the anchor frame.

The GTM 320-a may include an input coupled to an output of the MAC2 315-a for receiving the resultant exposure frame (e.g., a combined exposure frame) from the MAC2 315-a. The GTM 320-a may perform one or more image processing operations on the resultant exposure frame received from the MAC2 315-a. For example, the GTM 320-a may convert or map content from one representation or range to another. A global tone curve may be specified or determined for one or more frames (e.g., the long exposure frame 345-a, the medium exposure frame 340-a, and the short exposure frame 335-a) and used in converting content from one representation or range to another.

The GTM 320-a may include an output coupled to an input of the LTM 325-a, which may convert content from one representation or range to another, for example to maintain contrast which otherwise may not be able to be represented. The LTM 325-a may segment the resultant exposure frame processed by the GTM 320-a into multiple regions, with a tone curve specified or determined for each region. The LTM 325-a may help maintain contrast, for example when compressing past the otherwise achievable range of the device 105. This may, for example, be the case when display brightness is competing with ambient brightness, for example when in direct sunlight. The LTM 325-a may provide an HDR output 330.

One or more of the MAC1 310-a, the MAC2 315-a, the GTM 320-a, and the LTM 325-a of the image processing pipeline 305-a may support techniques for anchor frame switching. For example, one or more of the MAC1 310-a, the MAC2 315-a, the GTM 320-a, and the LTM 325-a of the image processing pipeline 305-a may support switching between using the long exposure frame 345-a as an anchor frame and the short exposure frame 335-a. In some examples, the image processing pipeline 305-a may use the short exposure frame 335-a when motion (e.g., human motion) is detected in a physical scene. In some other examples, the image processing pipeline 305-a may use the long exposure frame 345-a when no motion is detected in the physical scene.

In some cases, one or more of the image processing pipeline 305-b and the image processing pipeline 305-c may also support techniques for anchor frame switching. The image processing pipelines 305-b may receive a set of frames with different exposures. For example, the image processing pipelines 305-b may receive a long exposure frame 345-b, a medium exposure frame 340-b, and a short exposure frame 335-b. The MAC1 310-b may receive as input the medium exposure frame 340-a and the short exposure frame 335-b. The MAC1 310-b may perform one or more image processing operations on the medium exposure frame 340-b and the short exposure frame 335-b to produce a resultant exposure frame (e.g., a combined exposure frame). The MAC2 315-b may include a first input for receiving the long exposure frame 345-b and a second input for receiving the resultant exposure frame from the MAC1 310-b. The MAC2 315-b may perform one or more image processing operations on the resultant exposure frame received from the MAC1 310-b and the short exposure frame 335-b to produce a resultant exposure frame (e.g., a combined exposure frame).

One or more of the MAC1 310-b and the MAC2 315-b may generate a pixel map, for example, using the long exposure frame 345-b, and determine a region representing motion between at least two frames (e.g., the medium exposure frame 340-b and the short exposure frame 335-b). If the device 105 determines that a quantity of motion pixels in the region is higher than a threshold, the device 105 may select the short exposure frame 335-b as an anchor frame, beginning at a later frame (e.g., frame N+3). Alternatively, if the device 105 determines that the quantity of motion pixels in the region is less than the threshold, the device 105 may continue using the long exposure frame 345-b as the anchor frame.

The GTM 320-b may include an input coupled to an output of the MAC2 315-b for receiving the resultant exposure frame (e.g., a combined exposure frame) from the MAC2 315-b. The GTM 320-b may perform one or more image processing operations on the resultant exposure frame received from the MAC2 315-b. For example, the GTM 320-b may convert or map content from one representation or range to another. A global tone curve may be specified or determined for one or more frames (e.g., the long exposure frame 345-b, the medium exposure frame 340-b, and the short exposure frame 335-b) and used in converting content from one representation or range to another.

The GTM 320-b may include an output coupled to an input of the LTM 325-b, which may convert content from one representation or range to another, for example to maintain contrast which otherwise may not be able to be represented. The LTM 325-b may segment the resultant exposure frame processed by the GTM 320-b into multiple regions, with a tone curve specified or determined for each region. The LTM 325-b may help maintain contrast, for example when compressing past the otherwise achievable range of the device 105. This may, for example, be the case when display brightness is competing with ambient brightness, for example when in direct sunlight. The LTM 325-b may not provide an HDR output, for example, due a difference between highlight pixels and motion pixels associated with one or more of the long exposure frame 345-b, the medium exposure frame 340-b, and the short exposure frame 335-b.

Similarly, the image processing pipelines 305-*c* may receive a set of frames with different exposures. For example, the image processing pipelines 305-*c* may receive a long exposure frame 345-*c*, a medium exposure frame 340-*c*, and a short exposure frame 335-*c*. The MAC1 310-*c* may receive as input the medium exposure frame 340-*a* and the short exposure frame 335-*c*. The MAC1 310-*c* may perform one or more image processing operations on the medium exposure frame 340-*c* and the short exposure frame 335-*c* to produce a resultant exposure frame (e.g., a combined exposure frame). The MAC2 315-*c* may include a first input for receiving the long exposure frame 345-*c* and a second input for receiving the resultant exposure frame from the MAC1 310-*c*. The MAC2 315-*c* may perform one or more image processing operations on the resultant exposure frame received from the MAC1 310-*c* and the short exposure frame 335-*c* to produce a resultant exposure frame (e.g., a combined exposure frame).

One or more of the MAC1 310-*c* and the MAC2 315-*c* may generate a pixel map, for example, using the long exposure frame 345-*c*, and determine a region representing motion between at least two frames (e.g., the medium exposure frame 340-*c* and the short exposure frame 335-*c*). If the device 105 determines that a quantity of motion pixels in the region is higher than a threshold, the device 105 may select the short exposure frame 335-*c* as an anchor frame, beginning at a later frame (e.g., frame N+3). Alternatively, if the device 105 determines that the quantity of motion pixels in the region is less than the threshold, the device 105 may continue using the long exposure frame 345-*c* as the anchor frame.

The GTM 320-*c* may include an input coupled to an output of the MAC2 315-*c* for receiving the resultant exposure frame (e.g., a combined exposure frame) from the MAC2 315-*c*. The GTM 320-*c* may perform one or more image processing operations on the resultant exposure frame received from the MAC2 315-*c*. For example, the GTM 320-*c* may convert or map content from one representation or range to another. A global tone curve may be specified or determined for one or more frames (e.g., the long exposure frame 345-*c*, the medium exposure frame 340-*c*, and the short exposure frame 335-*c*) and used in converting content from one representation or range to another.

The GTM 320-*c* may include an output coupled to an input of the LTM 325-*c*, which may convert content from one representation or range to another, for example to maintain contrast which otherwise may not be able to be represented. The LTM 325-*c* may segment the resultant exposure frame processed by the GTM 320-*c* into multiple regions, with a tone curve specified or determined for each region. The LTM 325-*c* may help maintain contrast, for example when compressing past the otherwise achievable range of the device 105. This may, for example, be the case when display brightness is competing with ambient brightness, for example when in direct sunlight. The LTM 325-*c* may not provide an HDR output, for example, due a difference between highlight pixels and motion pixels associated with one or more of the long exposure frame 345-*c*, the medium exposure frame 340-*c*, and the short exposure frame 335-*c*.

Figure 4:
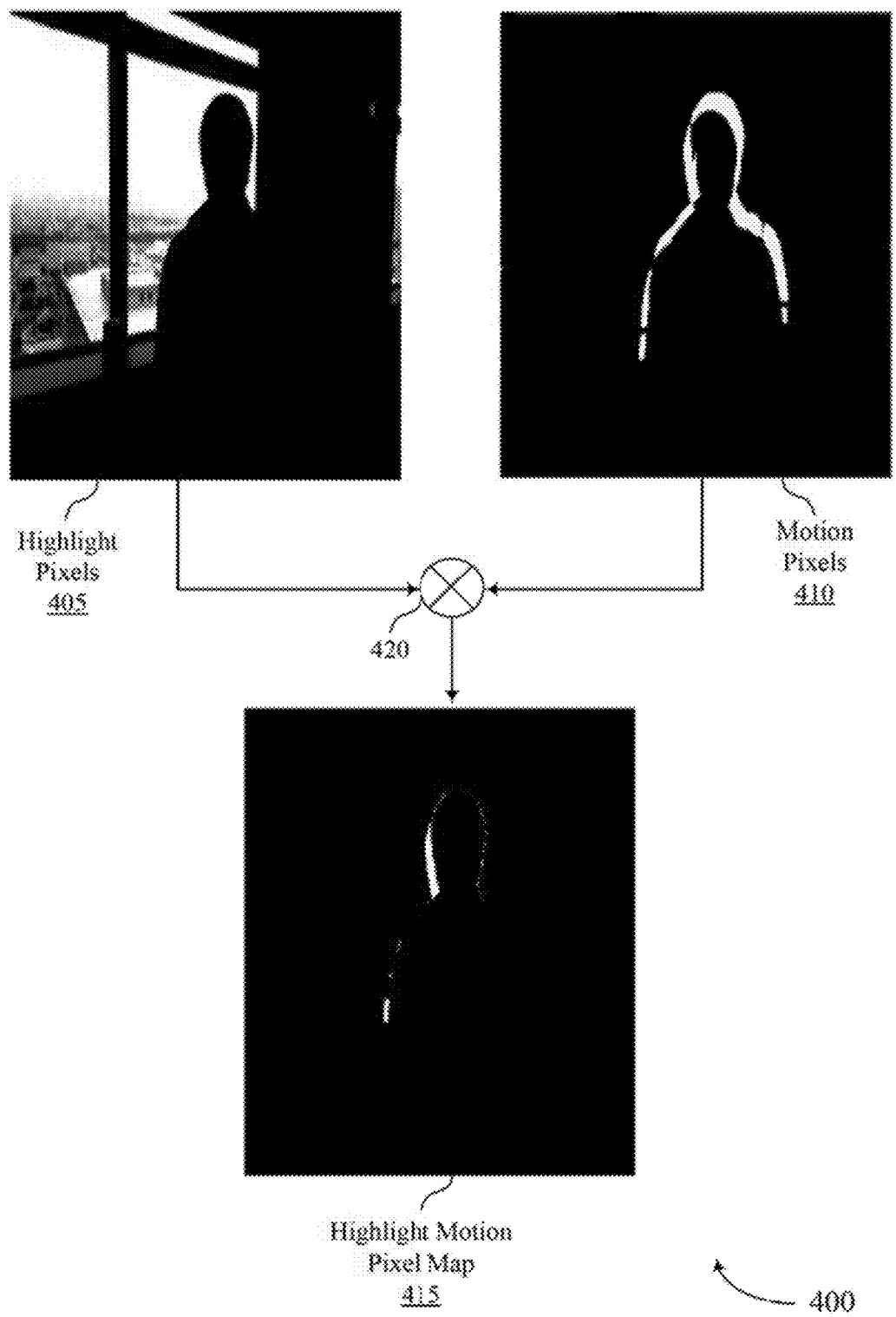
FIG. 4 illustrates an example of a pixel mapping that supports techniques for anchor frame switching in accordance with aspects of the present disclosure

FIG. 4 shows an example of a pixel mapping 400 that supports techniques for anchor frame switching in accordance with aspects of the present disclosure. The pixel mapping 400 may implement aspects of the multimedia system 100 or the HDR system 200 or may be implemented by aspects of the multimedia system 100 or the HDR system 200 as described with reference to FIGS. 1 and 2, respectively. For example, the pixel mapping 400 may be based on a configuration by a device 105, which may be implemented by the device 105. In the example of FIG. 4, a device 105 may determine a set of highlight pixels 405 associated with an image. The set of highlight pixels 405 may be as a result of a short exposure. The device 105 may also determine a set of motion pixels 410 associated with the image. The set of motion pixels 410 may be as a result of an anchor frame. The device 105 may perform a summation operation 420 of the set of highlight pixels 405 and the set of motion pixels 410 to produce a highlight motion pixel map 415. The device 105 may select an anchor frame based on the highlight motion pixel map 415 as described in FIG. 1.

Figure 5:
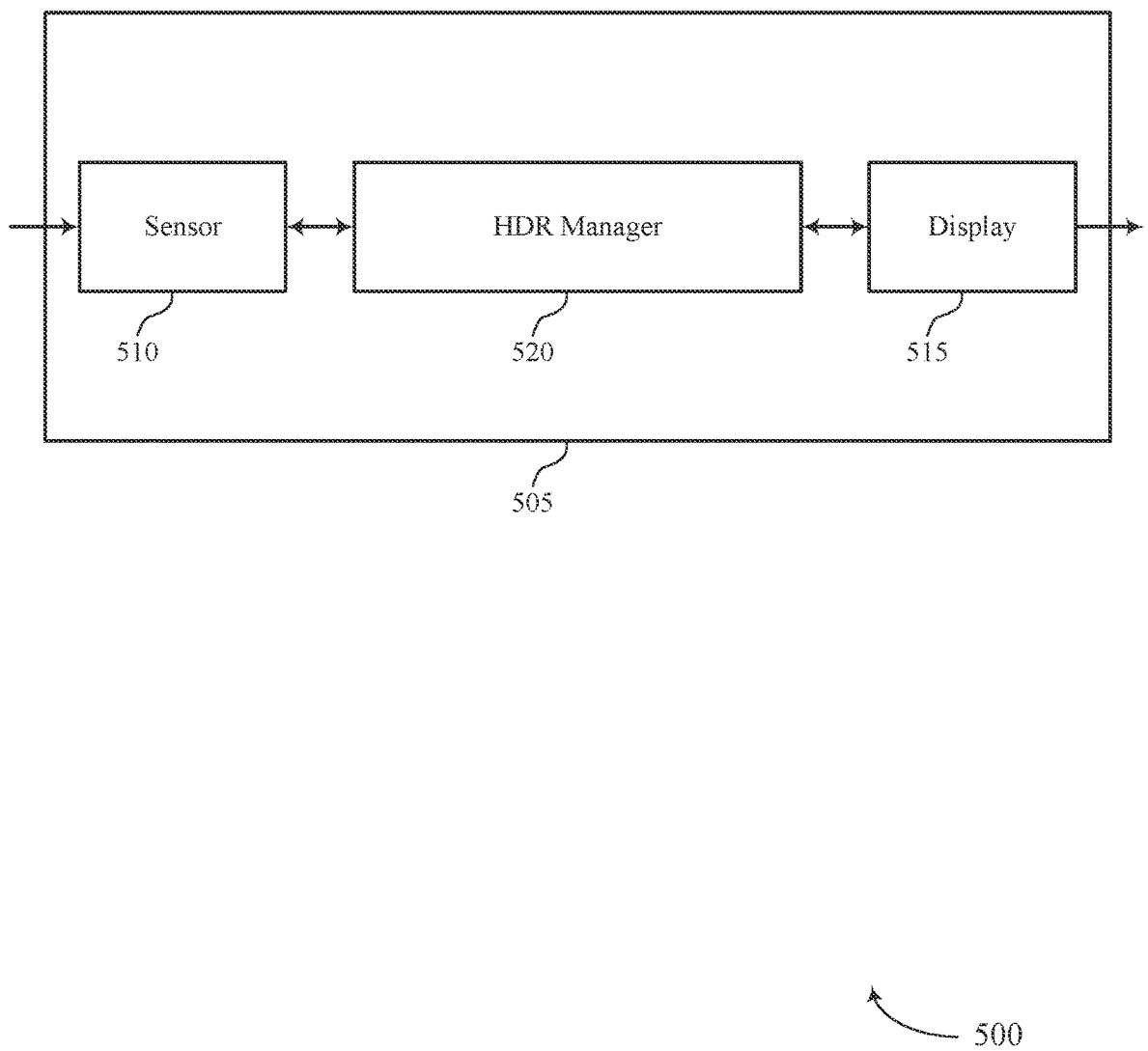
FIGS. 5 and 6 show block diagrams of devices that support techniques for anchor frame switching in accordance with aspects of the present disclosure.

FIG. 5 shows a block diagram 500 of a device 505 that supports techniques for anchor frame switching in accordance with aspects of the present disclosure. The device 505 may be an example of aspects of a camera device as described herein. The device 505 may include a sensor 510, a display 515, and an HDR manager 520. The device 505 may also include a processor. Each of these components may be in communication with one another (e.g., via one or more buses).

The one or more sensors 510 (e.g., image sensors, cameras, etc.) may receive information (e.g., light, for example, visible light and/or invisible light), which may be passed on to other components of the device 505. In some cases, the sensors 510 may be an example of aspects of the I/O controller 810 described with reference to FIG. 8. A sensor 510 may utilize one or more photosensitive elements that have a sensitivity to a spectrum of electromagnetic radiation to receive information (e.g., a sensor 510 may be configured or tuned to receive a pixel intensity value, red green blue (RGB) values, infrared (IR) light values, near-IR light values, ultraviolet (UV) light values of a pixel, etc.). The information may then be passed on to other components of the device 505.

Display 515 may display content generated by other components of the device. Display 515 may be an example of display 830 as described with reference to FIG. 8. In some examples, display 830 may be connected with a display buffer which stores rendered data until an image is ready to be displayed (e.g., as described with reference to FIG. 8). The display 515 may illuminate according to signals or information generated by other components of the device 505. For example, the display 515 may receive display information (e.g., pixel mappings, display adjustments) from sensor 510, and may illuminate accordingly. The display 515 may represent a unit capable of displaying video, images, text or any other type of data for consumption by a viewer.

The display 515 may include a liquid-crystal display (LCD), a light emitting diode (LED) display, an organic LED (OLED), an active-matrix OLED (AMOLED), or the like. In some cases, display 515 and an I/O controller (e.g., I/O controller 810) may be or represent aspects of a same component (e.g., a touchscreen) of device 505. The display 515 may be any suitable display or screen allowing for user interaction and/or allowing for presentation of information (such as captured images and video) for viewing by a user. In some aspects, the display 515 may be a touch-sensitive display. In some cases, the display 515 may display images captured by sensors, where the displayed images that are captured by sensors may depend on the configuration of light sources and active sensors by the HDR manager 520.

The HDR manager 520, the sensor 510, the display 515, or various combinations thereof or various components thereof may be examples of means for performing various aspects of anchor frame switching as described herein. For example, the HDR manager 520, the sensor 510, the display 515, or various combinations or components thereof may support a method for performing one or more of the functions described herein.

In some examples, the HDR manager 520, the sensor 510, the display 515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the HDR manager 520, the sensor 510, the display 515, or various combinations or components thereof may be implemented in code (e.g., as communications management software or firmware) executed by a processor. If implemented in code executed by a processor, the functions of the HDR manager 520, the sensor 510, the display 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the HDR manager 520 may be configured to perform various operations (e.g., receiving, monitoring, transmitting) using or otherwise in cooperation with the sensor 510, the display 515, or both. For example, the HDR manager 520 may receive information from the sensor 510, send information to the display 515, or be integrated in combination with the sensor 510, the display 515, or both to receive information, transmit information, or perform various other operations as described herein.

The HDR manager 520 may support image processing at the device 505 in accordance with examples as disclosed herein. For example, the HDR manager 520 may be configured as or otherwise support a means for generating a pixel map based on a first set of frames. A first subset of frames of the first set of frames have a first exposure and a second subset of frames of the first set of frames have a second exposure different than the first exposure. The HDR manager 520 may be configured as or otherwise support a means for determining a region of the pixel map representing motion between at least two frames of the first set of frames. The HDR manager 520 may be configured as or otherwise support a means for selecting an anchor frame based on comparing a set of motion pixels associated with the region of the pixel map to a threshold. The anchor frame may have the first exposure or the second exposure. The HDR manager 520 may be configured as or otherwise support a means for generating an image frame by combining a second set of frames based on the anchor frame.

By including or configuring the HDR manager 520 in accordance with examples as described herein, the device 505 (e.g., a processor controlling or otherwise coupled to the sensor 510, the display 515, the HDR manager 520, or a combination thereof) may support techniques for may support techniques for anchor frame switching may reduce processing, reduce power consumption, and provide more efficient utilization of device resources.

Figure 6:
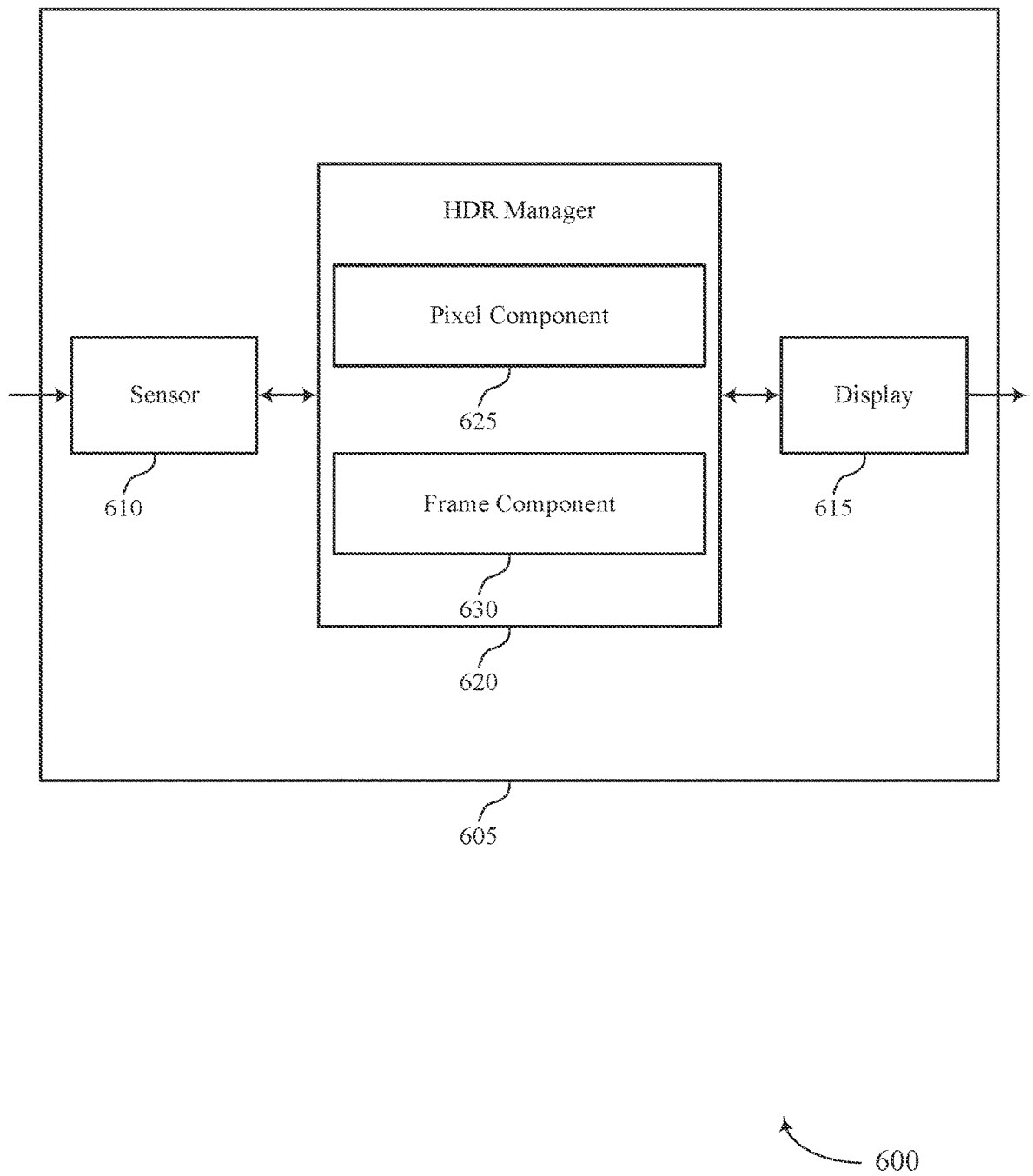

FIG. 6 shows a block diagram 600 of a device 605 that supports techniques for anchor frame switching in accordance with aspects of the present disclosure. The device 605 may be an example of aspects of a device 505 or a camera device 115 as described herein. The device 605 may include a sensor 610, a display 615, and an HDR manager 620. The device 605 may also include a processor. Each of these components may be in communication with one another (e.g., via one or more buses).

The one or more sensors 610 (e.g., image sensors, cameras, etc.) may receive information (e.g., light, for example, visible light and/or invisible light), which may be passed on to other components of the device 605. In some cases, the sensors 610 may be an example of aspects of the I/O controller 810 described with reference to FIG. 8. A sensor 610 may utilize one or more photosensitive elements that have a sensitivity to a spectrum of electromagnetic radiation to receive information (e.g., a sensor 610 may be configured or tuned to receive a pixel intensity value, red green blue (RGB) values, infrared (IR) light values, near-IR light values, ultraviolet (UV) light values of a pixel, etc.). The information may then be passed on to other components of the device 605.

Display 615 may display content generated by other components of the device. Display 615 may be an example of display 830 as described with reference to FIG. 8. In some examples, display 830 may be connected with a display buffer which stores rendered data until an image is ready to be displayed (e.g., as described with reference to FIG. 8). The display 615 may illuminate according to signals or information generated by other components of the device 605. For example, the display 615 may receive display information (e.g., pixel mappings, display adjustments) from sensor 610, and may illuminate accordingly. The display 615 may represent a unit capable of displaying video, images, text or any other type of data for consumption by a viewer.

The display 615 may include a liquid-crystal display (LCD), a light emitting diode (LED) display, an organic LED (OLED), an active-matrix OLED (AMOLED), or the like. In some cases, display 615 and an I/O controller (e.g., I/O controller 810) may be or represent aspects of a same component (e.g., a touchscreen) of device 605. The display 615 may be any suitable display or screen allowing for user interaction and/or allowing for presentation of information (such as captured images and video) for viewing by a user. In some aspects, the display 615 may be a touch-sensitive display. In some cases, the display 615 may display images captured by sensors, where the displayed images that are captured by sensors may depend on the configuration of light sources and active sensors by the HDR manager 620.

The device 605, or various components thereof, may be an example of means for performing various aspects of anchor frame switching in an imaging system as described herein. For example, the HDR manager 620 may include a pixel component 625 a frame component 630, or any combination thereof. The HDR manager 620 may be an example of aspects of an HDR manager 520 as described herein. In some examples, the HDR manager 620, or various components thereof, may be configured to perform various operations (e.g., receiving, monitoring, transmitting) using or otherwise in cooperation with the sensor 610, the display 615, or both. For example, the HDR manager 620 may receive information from the sensor 610, send information to the display 615, or be integrated in combination with the sensor 610, the display 615, or both to receive information, transmit information, or perform various other operations as described herein.

The HDR manager 620 may support image processing at a device in accordance with examples as disclosed herein. The pixel component 625 may be configured as or otherwise support a means for generating a pixel map based on a first set of frames. A first subset of frames of the first set of frames have a first exposure and a second subset of frames of the first set of frames have a second exposure different than the first exposure. The pixel component 625 may be configured as or otherwise support a means for determining a region of the pixel map representing motion between at least two frames of the first set of frames. The frame component 630 may be configured as or otherwise support a means for selecting an anchor frame based on comparing a set of motion pixels associated with the region of the pixel map to a threshold. The anchor frame has the first exposure or the second exposure. The frame component 630 may be configured as or otherwise support a means for generating an image frame by combining a second set of frames based on the anchor frame.

Figure 7:
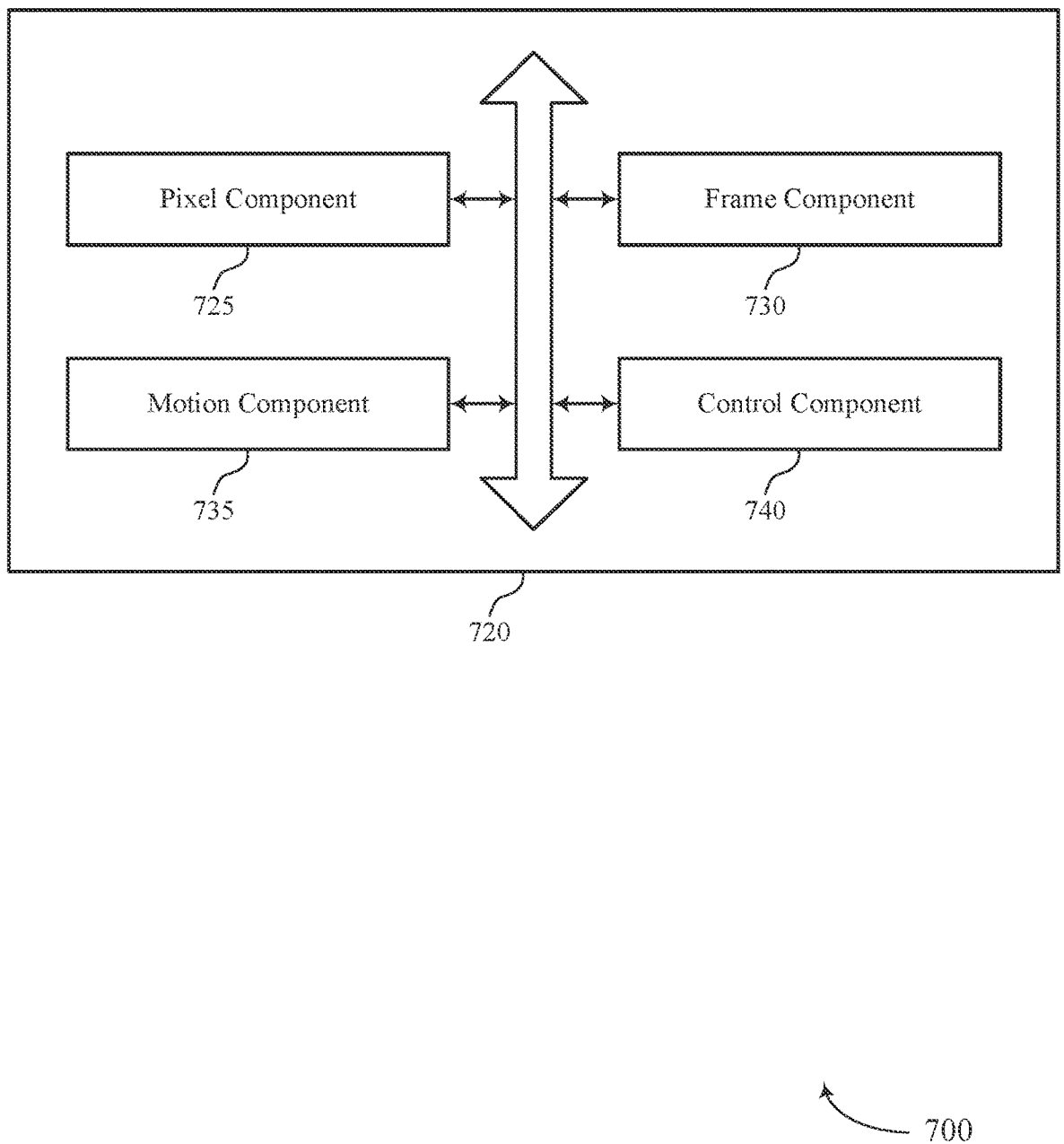
FIG. 7 shows a block diagram of an HDR manager that supports techniques for anchor frame switching in accordance with aspects of the present disclosure.

FIG. 7 shows a block diagram 700 of an HDR manager 720 that supports techniques for anchor frame switching in accordance with aspects of the present disclosure. The HDR manager 720 may be an example of aspects of an HDR manager 520, an HDR manager 620, or both, as described herein. The HDR manager 720, or various components thereof, may be an example of means for performing various aspects of anchor frame switching in an imaging system as described herein. For example, the HDR manager 720 may include a pixel component 725, a frame component 730, a motion component 735, a control component 740, or any combination thereof. Each of these components may communicate, directly or indirectly, with one another (e.g., via one or more buses).

The HDR manager 720 may support image processing at a device in accordance with examples as disclosed herein. The pixel component 725 may be configured as or otherwise support a means for generating a pixel map based on a first set of frames. A first subset of frames of the first set of frames have a first exposure and a second subset of frames of the first set of frames have a second exposure different than the first exposure. In some examples, the pixel component 725 may be configured as or otherwise support a means for determining a region of the pixel map representing motion between at least two frames of the first set of frames. The frame component 730 may be configured as or otherwise support a means for selecting an anchor frame based on comparing a set of motion pixels associated with the region of the pixel map to a threshold. The anchor frame has the first exposure or the second exposure. In some examples, the frame component 730 may be configured as or otherwise support a means for generating an image frame by combining a second set of frames based on the anchor frame.

The frame component 730 may be configured as or otherwise support a means for selecting a first frame of the first subset of frames as the anchor frame. In some examples, the first frame has the first exposure. In some examples, the frame component 730 may be configured as or otherwise support a means for generating the image frame by combining the second set of frames based on the selecting of the first frame of the first subset of frames as the anchor frame. The motion component 735 may be configured as or otherwise support a means for determining that the set of motion pixels associated with the region of the pixel map fails to satisfy the threshold. The frame component 730 may be configured as or otherwise support a means for maintaining the first frame of the first subset of frames as the anchor frame based on the determining that the set of motion pixels associated with the region of the pixel map fails to satisfy the threshold. In some other examples, the motion component 735 may be configured as or otherwise support a means for determining that the set of motion pixels associated with the region of the pixel map satisfies the threshold. The frame component 730 may be configured as or otherwise support a means for selecting a second frame of the second subset of frames as the anchor frame based on the determining that the set of motion pixels associated with the region of the pixel map satisfies the threshold, where the second frame has the second exposure.

The frame component 730 may be configured as or otherwise support a means for switching from the first frame as the anchor frame to the second frame as the anchor frame. In some examples, the frame component 730 may be configured as or otherwise support a means for generating of the image frame by the combining of the second set of frames based on the switching. In some examples, the control component 740 may be configured as or otherwise support a means for enabling a hysteresis control for different exposure levels based on the switching from the first frame as the anchor frame to the second frame as the anchor frame. The frame component 730 may be configured as or otherwise support a means for capturing the first set of frames using one or more image sensors of the device. In some examples, the pixel component 725 may be configured as or otherwise support a means for generating of the pixel map based on the capturing of the first set of frames. In some examples, a third subset of frames of the second set of frames have the first exposure and a fourth subset of frames of the second set of frames have the second exposure.

In some examples, the motion component 735 may be configured as or otherwise support a means for determining that the set of motion pixels satisfies the threshold based on determining that a quantity of the set of motion pixels satisfies a quantity threshold. In some examples, the frame component 730 may be configured as or otherwise support a means for selecting of the anchor frame based on the determining that the quantity of the set of motion pixels satisfies the quantity threshold. In some examples, the second exposure is different from the first exposure. In some examples, the first exposure includes a short exposure, a medium exposure, or a long exposure. In some examples, the second exposure includes the short exposure, the medium exposure, or the long exposure. In some examples, the image frame includes an HDR image frame.

Figure 8:
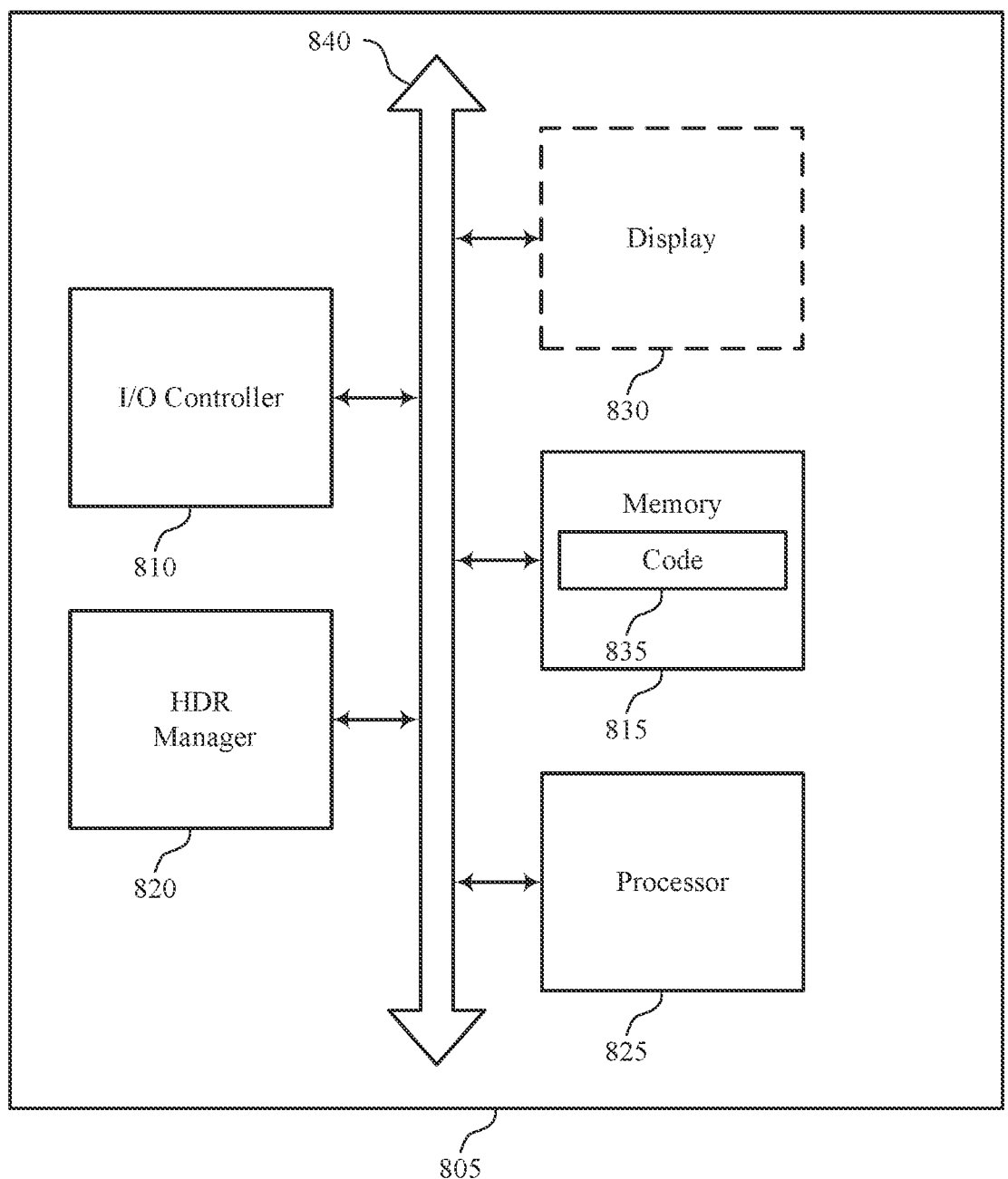
FIG. 8 shows a diagram of a system including a device that supports techniques for anchor frame switching in accordance with aspects of the present disclosure.

FIG. 8 shows a diagram of a system 800 including a device 805 that supports techniques for anchor frame switching in accordance with aspects of the present disclosure. The device 805 may be an example of or include the components of a device 505, a device 605, or a camera device as described herein. The device 805 may include components for bi-directional voice and data communications including components for transmitting and receiving communications, such as an HDR manager 820, an I/O controller 810, a memory 815, a processor 825, and a display 830. These components may be in electronic communication or otherwise coupled (e.g., operatively, communicatively, functionally, electronically, electrically) via one or more buses (e.g., a bus 840).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In some other cases, the I/O controller 810 may represent or interact with a modem, a keyboard, a mouse, a touchscreen, or a similar device. In some cases, the I/O controller 810 may be implemented as part of a processor, such as the processor 825. In some cases, a user may interact with the device 805 via the I/O controller 810 or via hardware components controlled by the I/O controller 810.

The memory 815 may include RAM and ROM. The memory 815 may store computer-readable, computer-executable code 835 including instructions that, when executed by the processor 825, cause the device 805 to perform various functions described herein. The code 835 may be stored in a non-transitory computer-readable medium such as system memory or other type of memory. In some cases, the code 835 may not be directly executable by the processor 825 but may cause a computer (e.g., when compiled and executed) to perform functions described herein. In some cases, the memory 815 may contain, among other things, a BIOS which may control basic hardware or software operation such as the interaction with peripheral components or devices.

The processor 825 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 825 may be configured to operate a memory array using a memory controller. In some other cases, a memory controller may be integrated into the processor 825. The processor 825 may be configured to execute computer-readable instructions stored in a memory (e.g., the memory 815) to cause the device 805 to perform various functions (e.g., functions or tasks supporting anchor frame switching in an imaging system). For example, the device 805 or a component of the device 805 may include a processor 825 and memory 815 coupled to the processor 825, the processor 825 and memory 815 configured to perform various functions described herein.

The HDR manager 820 may support image processing at a device in accordance with examples as disclosed herein. For example, the HDR manager 820 may be configured as or otherwise support a means for generating a pixel map based on a first set of frames. A first subset of frames of the first set of frames have a first exposure and a second subset of frames of the first set of frames have a second exposure different than the first exposure. The HDR manager 820 may be configured as or otherwise support a means for determining a region of the pixel map representing motion between at least two frames of the first set of frames. The HDR manager 820 may be configured as or otherwise support a means for selecting an anchor frame based on comparing a set of motion pixels associated with the region of the pixel map to a threshold, where the anchor frame has the first exposure or the second exposure. The HDR manager 820 may be configured as or otherwise support a means for generating an image frame by combining a second set of frames based on the anchor frame. By including or configuring the HDR manager 820 in accordance with examples as described herein, the device 805 may support techniques for improved user experience related to reduced processing, reduced power consumption, more efficient utilization of device resources, and longer battery life.

The HDR manager 820, or its sub-components, may be implemented in hardware, code (e.g., software or firmware) executed by a processor, or any combination thereof. If implemented in code executed by a processor, the functions of the HDR manager 820, or its sub-components may be executed by a general-purpose processor, a DSP, an ASIC, a field programmable gate array (FPGA) or other programmable logic device, discrete gate or transistor logic, discrete hardware components, or any combination thereof designed to perform the functions described in the present disclosure. The HDR manager 820, or its sub-components, may be physically located at various positions, including being distributed such that portions of functions are implemented at different physical locations by one or more physical components. In some examples, the HDR manager 820, or its sub-components, may be a separate and distinct component in accordance with various aspects of the present disclosure. In some examples, the HDR manager 820, or its sub-components, may be combined with one or more other hardware components, including but not limited to an I/O component, a camera controller, another computing device, one or more other components described in the present disclosure, or a combination thereof in accordance with various aspects of the present disclosure.

Figure 9:
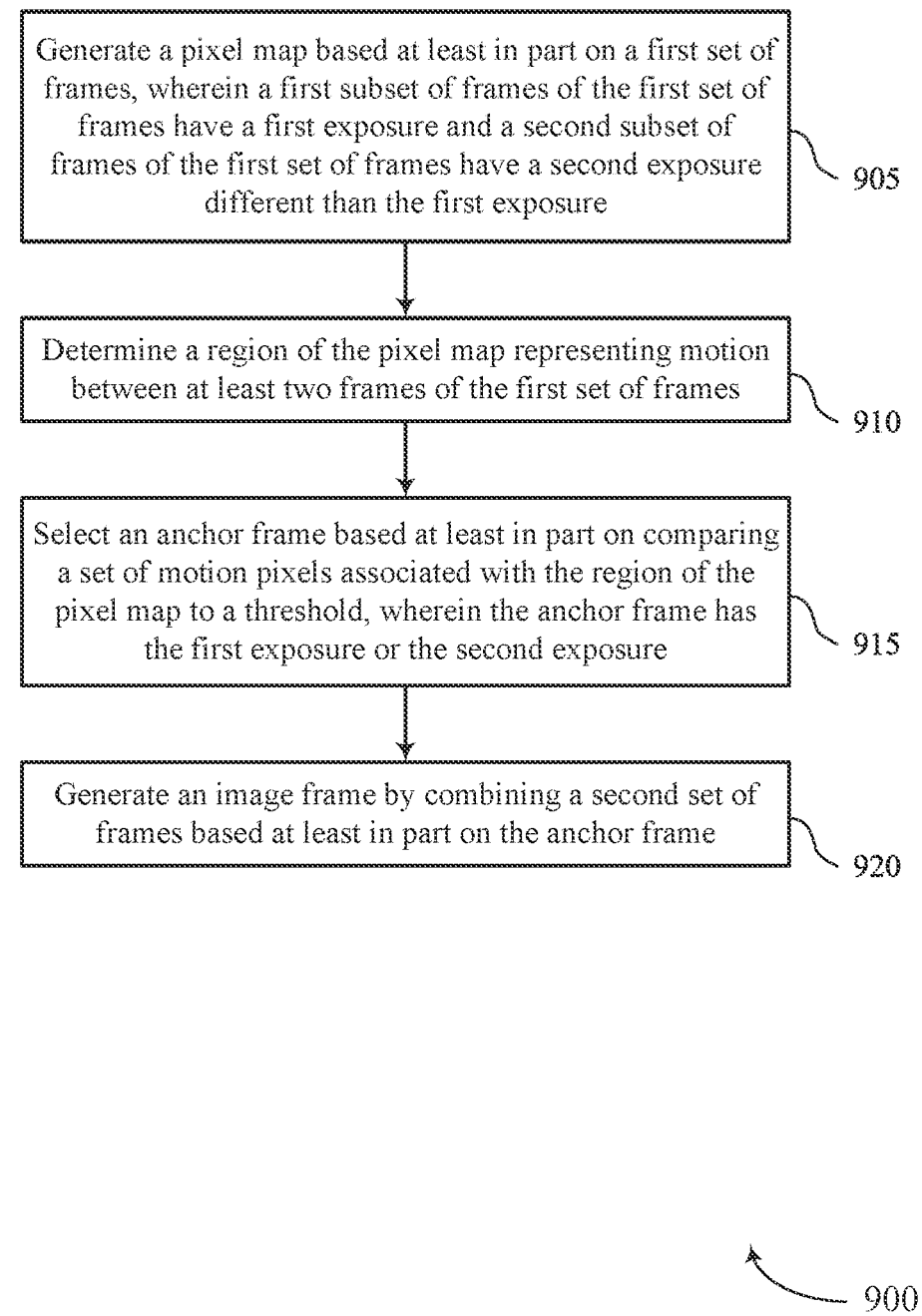
FIGS. 9 and 10 show flowcharts illustrating methods that support techniques for anchor frame switching in accordance with aspects of the present disclosure.

FIG. 9 shows a flowchart illustrating a method 900 that supports techniques for anchor frame switching in accordance with aspects of the present disclosure. The operations of the method 900 may be implemented by a camera device or its components as described herein. For example, the operations of the method 900 may be performed by a camera device as described with reference to FIGS. 1 through 8. In some examples, a camera device may execute a set of instructions to control the functional elements of the camera device to perform the described functions. Additionally or alternatively, the camera device may perform aspects of the described functions using special-purpose hardware.

At 905, the method may include generating a pixel map based on a first set of frames, where a first subset of frames of the first set of frames have a first exposure and a second subset of frames of the first set of frames have a second exposure different than the first exposure. The operations of 905 may be performed in accordance with examples as disclosed herein. In some examples, aspects of the operations of 905 may be performed by a pixel component 725 as described with reference to FIG. 7.

At 910, the method may include determining a region of the pixel map representing motion between at least two frames of the first set of frames. The operations of 910 may be performed in accordance with examples as disclosed herein. In some examples, aspects of the operations of 910 may be performed by a pixel component 725 as described with reference to FIG. 7.

At 915, the method may include selecting an anchor frame based on comparing a set of motion pixels associated with the region of the pixel map to a threshold, where the anchor frame has the first exposure or the second exposure. The operations of 915 may be performed in accordance with examples as disclosed herein. In some examples, aspects of the operations of 915 may be performed by a frame component 730 as described with reference to FIG. 7.

At 920, the method may include generating an image frame by combining a second set of frames based on the anchor frame. The operations of 920 may be performed in accordance with examples as disclosed herein. In some examples, aspects of the operations of 920 may be performed by a frame component 730 as described with reference to FIG. 7.

Figure 10:
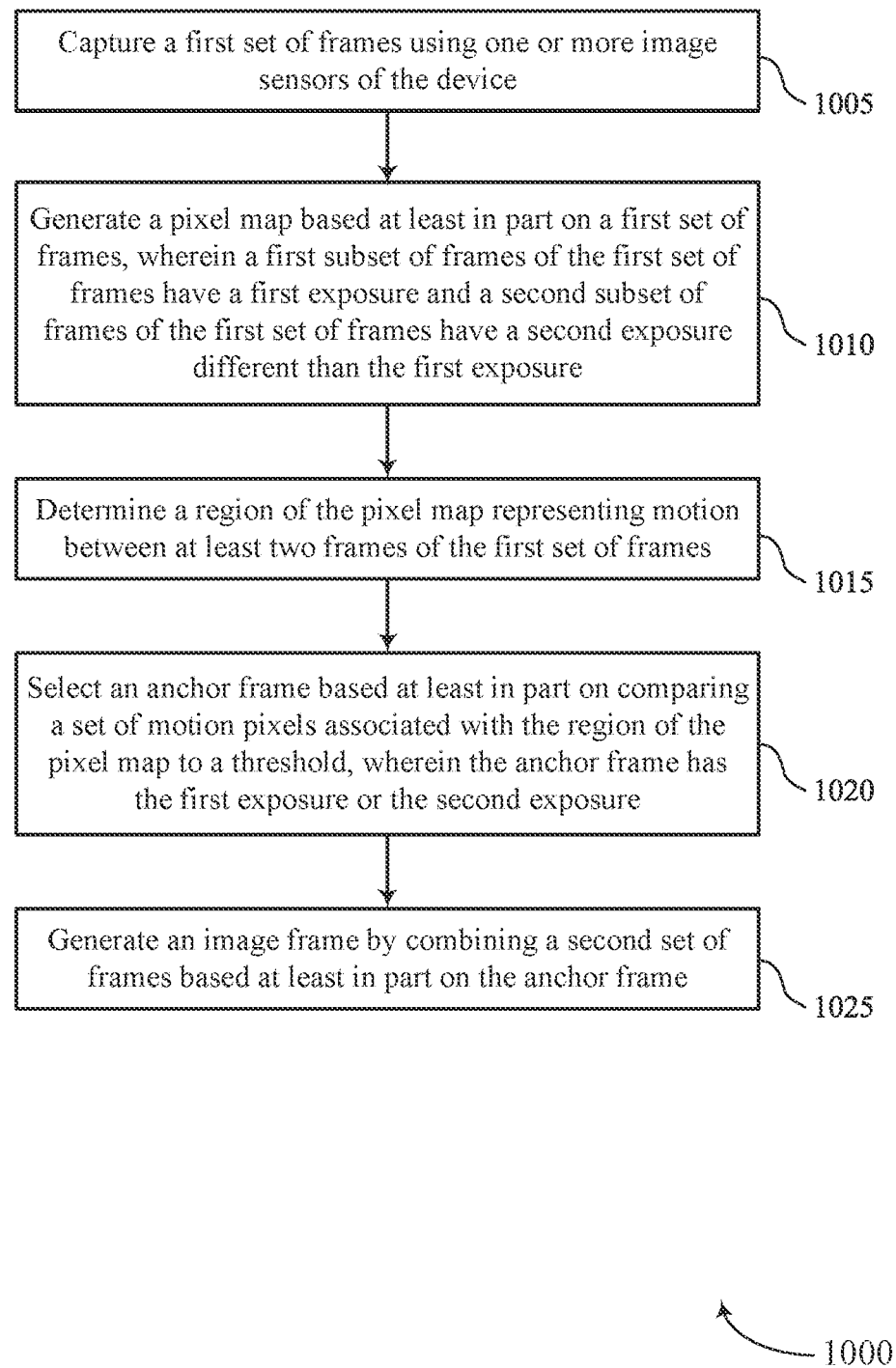

FIG. 10 shows a flowchart illustrating a method 1000 that supports techniques for anchor frame switching in accordance with aspects of the present disclosure. The operations of the method 1000 may be implemented by a camera device or its components as described herein. For example, the operations of the method 1000 may be performed by a camera device as described with reference to FIGS. 1 through 8. In some examples, a camera device may execute a set of instructions to control the functional elements of the camera device to perform the described functions. Additionally or alternatively, the camera device may perform aspects of the described functions using special-purpose hardware.

At 1005, the method may include capturing a first set of frames using one or more image sensors of the device. The operations of 1005 may be performed in accordance with examples as disclosed herein. In some examples, aspects of the operations of 1005 may be performed by a frame component 730 as described with reference to FIG. 7.

At 1010, the method may include generating a pixel map based on the first set of frames, where a first subset of frames of the first set of frames have a first exposure and a second subset of frames of the first set of frames have a second exposure different than the first exposure. The operations of 1010 may be performed in accordance with examples as disclosed herein. In some examples, aspects of the operations of 1010 may be performed by a pixel component 725 as described with reference to FIG. 7.

At 1015, the method may include determining a region of the pixel map representing motion between at least two frames of the first set of frames. The operations of 1015 may be performed in accordance with examples as disclosed herein. In some examples, aspects of the operations of 1015 may be performed by a pixel component 725 as described with reference to FIG. 7.

At 1020, the method may include selecting an anchor frame based on comparing a set of motion pixels associated with the region of the pixel map to a threshold, where the anchor frame has the first exposure or the second exposure. The operations of 1020 may be performed in accordance with examples as disclosed herein. In some examples, aspects of the operations of 1020 may be performed by a frame component 730 as described with reference to FIG. 7.

At 1025, the method may include generating an image frame by combining a second set of frames based on the anchor frame. The operations of 1025 may be performed in accordance with examples as disclosed herein. In some examples, aspects of the operations of 1025 may be performed by a frame component 730 as described with reference to FIG. 7.

The following provides an overview of aspects of the present disclosure:

Aspect 1: A method for image processing at a device, comprising: generating a pixel map based at least in part on a first set of frames, wherein a first subset of frames of the first set of frames have a first exposure and a second subset of frames of the first set of frames have a second exposure different than the first exposure; determining a region of the pixel map representing motion between at least two frames of the first set of frames; selecting an anchor frame based at least in part on comparing a set of motion pixels associated with the region of the pixel map to a threshold, wherein the anchor frame has the first exposure or the second exposure; and generating an image frame by combining a second set of frames based at least in part on the anchor frame.

Aspect 2: The method of aspect 1, further comprising: selecting a first frame of the first subset of frames as the anchor frame, wherein the first frame has the first exposure, wherein the generating of the image frame by combining the second set of frames is based at least in part on the selecting of the first frame of the first subset of frames as the anchor frame.

Aspect 3: The method of aspect 2, further comprising: determining that the set of motion pixels associated with the region of the pixel map fails to satisfy the threshold; and maintaining the first frame of the first subset of frames as the anchor frame based at least in part on the determining that the set of motion pixels associated with the region of the pixel map fails to satisfy the threshold.

Aspect 4: The method of any of aspects 2 through 3, further comprising: determining that the set of motion pixels associated with the region of the pixel map satisfies the threshold: and selecting a second frame of the second subset of frames as the anchor frame based at least in part on the determining that the set of motion pixels associated with the region of the pixel map satisfies the threshold, wherein the second frame has the second exposure.

Aspect 5: The method of aspect 4, further comprising: switching from the first frame as the anchor frame to the second frame as the anchor frame, wherein the generating of the image frame by the combining of the second set of frames based at least in part on the switching.

Aspect 6: The method of aspect 5, further comprising: enabling a hysteresis control for different exposure levels based at least in part on the switching from the first frame as the anchor frame to the second frame as the anchor frame.

Aspect 7: The method of any of aspects 1 through 6, further comprising: capturing the first set of frames using one or more image sensors of the device, wherein the generating of the pixel map is based at least in part on the capturing of the first set of frames.

Aspect 8: The method of any of aspects 1 through 7, wherein a third subset of frames of the second set of frames have the first exposure and a fourth subset of frames of the second set of frames have the second exposure.

Aspect 9: The method of any of aspects 1 through 8, further comprising: determining that the set of motion pixels satisfies the threshold based at least in part on determining that a quantity of the set of motion pixels satisfies a quantity threshold, wherein the selecting of the anchor frame is based at least in part on the determining that the quantity of the set of motion pixels satisfies the quantity threshold.

Aspect 10: The method of any of aspects 1 through 9, wherein the second exposure is different from the first exposure.

Aspect 11: The method of aspect 10, wherein the first exposure comprises a short exposure, a medium exposure, or a long exposure.

Aspect 12: The method of aspect 11, wherein the second exposure comprises the short exposure, the medium exposure, or the long exposure.

Aspect 13: The method of any of aspects 1 through 12, wherein the image frame comprises an HDR image frame.

Aspect 14: An apparatus for image processing at a device, comprising a processor; memory coupled with the processor: and instructions stored in the memory and executable by the processor to cause the apparatus to perform a method of any of aspects 1 through 13.

Aspect 15: An apparatus for image processing at a device, comprising at least one means for performing a method of any of aspects 1 through 13.

Aspect 16: A non-transitory computer-readable medium storing code for image processing at a device, the code comprising instructions executable by a processor to perform a method of any of aspects 1 through 13.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims. "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for image processing at a device, comprising:
   generating a first image frame by combining a first set of frames based at least in part on a first anchor frame, the first anchor frame having a first exposure;
   generating a pixel map based at least in part on the first set of frames, wherein a first subset of frames of the first set of frames have the first exposure and a second subset of frames of the first set of frames have a second exposure different than the first exposure;
   determining a region of the pixel map representing motion between at least two frames of the first set of frames;
   selecting a second anchor frame based at least in part on comparing a set of motion pixels associated with the region of the pixel map to a threshold, wherein the second anchor frame has the second exposure;
   switching from the first anchor frame to the second anchor frame based at least in part on one or more tuning parameters associated with a user preference; and generating a second image frame by combining a second set of frames based at least in part on the switching.

2. The method of claim 1, further comprising:
selecting a first frame of the first subset of frames as the second anchor frame,
wherein the generating of the second image frame by combining the second set of frames is based at least in part on the selecting of the first frame of the first subset of frames as the second anchor frame.

3. The method of claim 2, further comprising:
determining that the set of motion pixels associated with the region of the pixel map satisfies the threshold, wherein selecting the second anchor frame is based at least in part on the determining that the set of motion pixels associated with the region of the pixel map satisfies the threshold.

4. The method of claim 3, further comprising:
enabling a hysteresis control for different exposure levels based at least in part on the switching, wherein the hysteresis control is based at least in part on the one or more tuning parameters associated with the user preference.

5. The method of claim 1, further comprising:
capturing the first set of frames using one or more image sensors of the device,
wherein the generating of the pixel map is based at least in part on the capturing of the first set of frames.

6. The method of claim 1, wherein a third subset of frames of the second set of frames have the first exposure and a fourth subset of frames of the second set of frames have the second exposure.

7. The method of claim 1, further comprising:
determining that the set of motion pixels satisfies the threshold based at least in part on determining that a quantity of the set of motion pixels satisfies a quantity threshold,
wherein the selecting of the second anchor frame is based at least in part on the determining that the quantity of the set of motion pixels satisfies the quantity threshold.

8. The method of claim 1, wherein the first exposure comprises a short exposure, a medium exposure, or a long exposure.

9. The method of claim 8, wherein the second exposure comprises the short exposure, the medium exposure, or the long exposure.

10. The method of claim 1, wherein the second image frame comprises a high-dynamic range image frame.

11. An apparatus for image processing, comprising:
a processor;
memory coupled with the processor; and
instructions stored in the memory and executable by the processor to cause the apparatus to:
generate a first image frame by combining a first set of frames based at least in part on a first anchor frame, the first anchor frame having a first exposure;
generate a pixel map based at least in part on the first set of frames, wherein a first subset of frames of the first set of frames have the first exposure and a second subset of frames of the first set of frames have a second exposure different than the first exposure;
determine a region of the pixel map representing motion between at least two frames of the first set of frames;
select a second anchor frame based at least in part on comparing a set of motion pixels associated with the region of the pixel map to a threshold, wherein the second anchor frame has the second exposure;
switch from the first anchor frame to the second anchor frame based at least in part on one or more tuning parameters associated with a user preference; and
generate a second image frame by combining a second set of frames based at least in part on the switching.

12. The apparatus of claim 11, wherein the instructions are further executable by the processor to cause the apparatus to:
select a first frame of the first subset of frames as the second anchor frame,
wherein the instructions for generating of the second image frame by combining the second set of frames are further executable by the processor based at least in part on the selecting of the first frame of the first subset of frames as the second anchor frame.

13. The apparatus of claim 12, wherein the instructions are further executable by the processor to cause the apparatus to:
determine that the set of motion pixels associated with the region of the pixel map satisfies the threshold, wherein the instructions for selecting the second anchor frame is based at least in part on the determining that the set of motion pixels associated with the region of the pixel map satisfies the threshold.

14. The apparatus of claim 11, wherein the instructions are further executable by the processor to cause the apparatus to:
enable a hysteresis control for different exposure levels based at least in part on the switching, wherein the hysteresis control is based at least in part on the one or more tuning parameters associated with the user preference.

15. The apparatus of claim 11, wherein the instructions are further executable by the processor to cause the apparatus to:
capture the first set of frames using one or more image sensors of the apparatus,
wherein the instructions for generating of the pixel map are further executable by the processor based at least in part on the capturing of the first set of frames.

16. The apparatus of claim 11, wherein a third subset of frames of the second set of frames have the first exposure and a fourth subset of frames of the second set of frames have the second exposure.

17. The apparatus of claim 11, wherein the instructions are further executable by the processor to cause the apparatus to:
determine that the set of motion pixels satisfies the threshold based at least in part on determining that a quantity of the set of motion pixels satisfies a quantity threshold,
wherein the instructions for selecting of the second anchor frame are further executable by the processor based at least in part on the determining that the quantity of the set of motion pixels satisfies the quantity threshold.

18. The apparatus of claim 11, wherein the first exposure comprises a short exposure, a medium exposure, or a long exposure.

19. The apparatus of claim 18, wherein the second exposure comprises the short exposure, the medium exposure, or the long exposure.

20. An apparatus for image processing, comprising:
means for generating a first image frame by combining a first set of frames based at least in part on a first anchor frame, the first anchor frame having a first exposure;
means for generating a pixel map based at least in part on the first set of frames, wherein a first subset of frames of the first set of frames have the first exposure and a second subset of frames of the first set of frames have a second exposure different than the first exposure;

means for determining a region of the pixel map representing motion between at least two frames of the first set of frames;

means for selecting a second anchor frame based at least in part on comparing a set of motion pixels associated with the region of the pixel map to a threshold, wherein the second anchor frame has the second exposure;

means for switching from the first anchor frame to the second anchor frame based at least in part on one or more tuning parameters associated with a user preference; and means for generating a second image frame by combining a second set of frames based at least in part on the switching.

* * * * *